(12) United States Patent
Jahnsen

(10) Patent No.: US 7,721,524 B2
(45) Date of Patent: May 25, 2010

(54) INTEGRATED AIRBREATHING AND NON-AIRBREATHING ENGINE SYSTEM

(75) Inventor: Eric Jahnsen, Jupiter, FL (US)

(73) Assignee: United Technologies Corporation, Hartford, CT (US)

( * ) Notice: Subject to any disclaimer, the term of this patent is extended or adjusted under 35 U.S.C. 154(b) by 831 days.

(21) Appl. No.: 11/354,453

(22) Filed: Feb. 15, 2006

(65) Prior Publication Data
US 2009/0282806 A1   Nov. 19, 2009

(51) Int. Cl.
*F02K 3/00* (2006.01)
(52) U.S. Cl. .......................................... 60/224; 60/257
(58) Field of Classification Search .................. 60/224, 60/225, 244, 245, 257, 771, 246
See application file for complete search history.

(56) References Cited

U.S. PATENT DOCUMENTS

| | | | | |
|---|---|---|---|---|
| 2,673,445 A | * | 3/1954 | Bruckmann | 60/225 |
| 2,676,457 A | * | 4/1954 | Kramer | 60/257 |
| 2,713,243 A | * | 7/1955 | Seaver | 60/225 |
| 2,960,824 A | * | 11/1960 | Plummer | 60/789 |
| 2,968,146 A | * | 1/1961 | Howell et al. | 60/246 |
| 3,002,340 A | * | 10/1961 | Landerman | 60/246 |
| 3,229,459 A | * | 1/1966 | Cervenka | 60/244 |
| 3,308,626 A | * | 3/1967 | Nelson et al. | 60/244 |
| 4,096,803 A | * | 6/1978 | Kesting | 102/378 |
| 4,817,892 A | * | 4/1989 | Janeke | 244/15 |
| 5,052,176 A | * | 10/1991 | Labatut et al. | 60/225 |
| 5,119,626 A | | 6/1992 | Lardellier et al. | |
| 5,159,809 A | * | 11/1992 | Ciais et al. | 60/225 |
| 6,148,609 A | * | 11/2000 | Provitola | 60/246 |
| 7,305,816 B2 | * | 12/2007 | Freese et al. | 60/218 |

* cited by examiner

*Primary Examiner*—Michael Cuff
*Assistant Examiner*—Phutthiwat Wongwian
(74) *Attorney, Agent, or Firm*—Kinney & Lange, P.A.

(57) ABSTRACT

An engine assembly includes a gas-turbine engine having a tailcone portion and a bypass duct, a rocket engine combustion assembly located at the tailcone portion of the gas-turbine engine, and a movable nozzle segment subassembly that is selectively engageable with the gas-turbine engine bypass duct in an open position and with the rocket engine combustion assembly in a closed position.

17 Claims, 18 Drawing Sheets

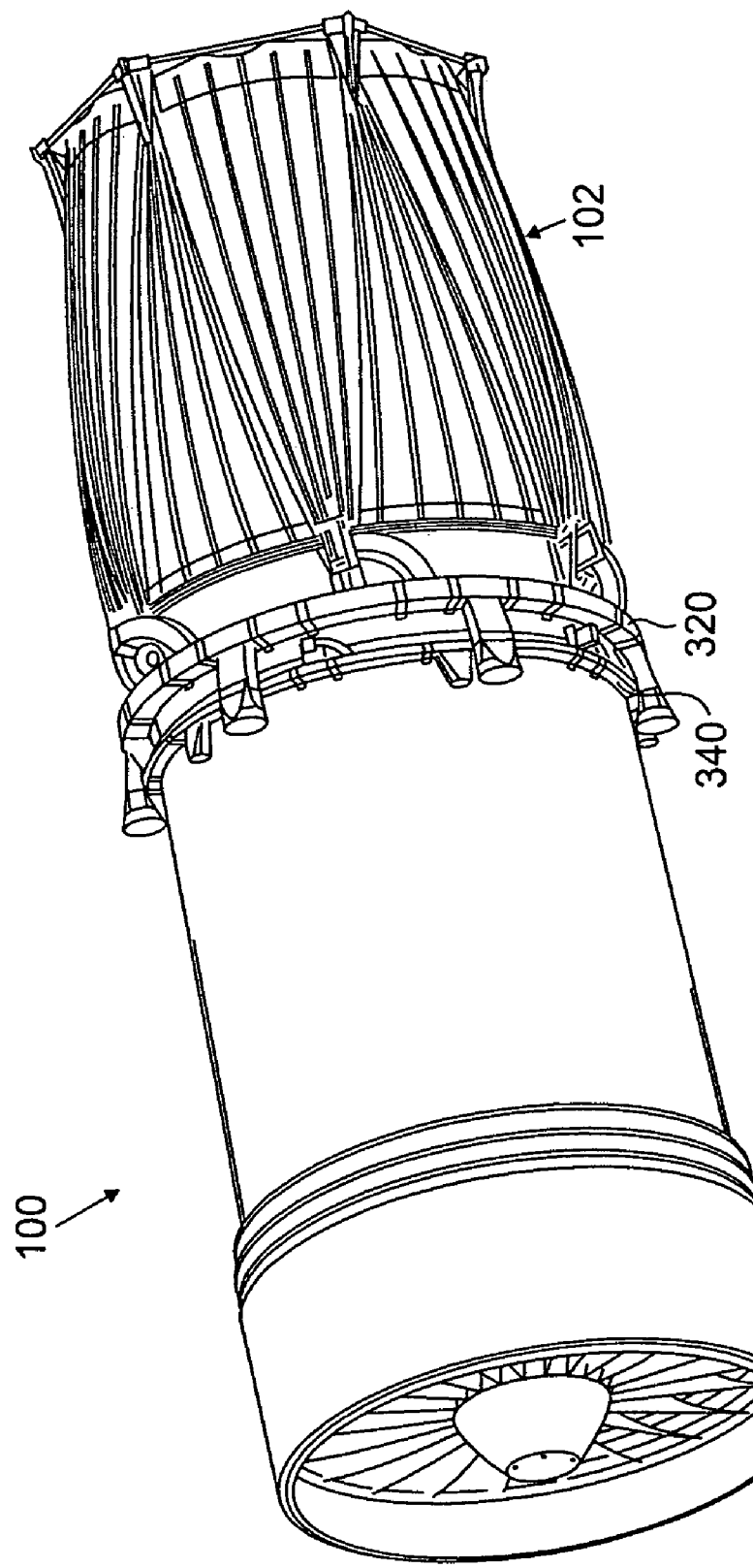

INTEGRATED AIRBREATHING AND NON-AIRBREATHING ENGINE SYSTEM

BACKGROUND OF THE INVENTION

Space travel has traditionally utilized vertical takeoffs to send a vehicle to orbit. Vertical takeoff vehicles utilize a controlled explosion to produce enough thrust to overcome the inertia of the motionless vehicle, which generally weighs millions of pounds including fuel and cargo. The stress generated by such vertical liftoffs is tremendous. Such stresses can limit the re-usability of components, and can lead to failure of components during flight. Historically, vertical takeoff vehicles have not been able to achieve the same level of safety and reliability rates as found with commercial jet aviation. Moreover, even reusable shuttlecraft utilize booster rockets, which are expensive and present retrieval or disposal difficulties after being jettisoned.

It is desired to provide safe, reliable and cost-effective access to space. Thus, the present invention provides a single-stage-to-orbit engine system that can be used with a vehicle suitable for horizontal takeoffs and horizontal landings.

BRIEF SUMMARY OF THE INVENTION

An engine assembly according to the present invention includes a gas-turbine engine having a tailcone portion and a bypass duct, a rocket engine combustion assembly located at the tailcone portion of the gas-turbine engine, and a movable nozzle segment subassembly that is selectively engageable with the gas-turbine engine bypass duct in an open position and with the rocket engine combustion assembly in a closed position.

BRIEF DESCRIPTION OF THE DRAWINGS

FIG. 1A is a perspective view of an engine system according to the present invention shown configured for airbreathing operation.

DETAILED DESCRIPTION

Generally, the present invention provides a single-stage-to-orbit engine system that can be used with a vehicle suitable for horizontal takeoffs and horizontal landings. The engine system provides an integrated airbreathing and non-airbreathing propulsion system. A conventional horizontal takeoff can be achieved as the engine system operates like an airbreathing gas-turbine engine. Once a suitable altitude and speed have been reached, the engine system can transition to operate like a non-airbreathing rocket engine and propel the vehicle further to orbit. A convertible nozzle and ejector duct assembly is utilized to transition the engine from airbreathing to non-airbreathing operation, or vice-versa.

As used herein, the term "single-stage-to-obit" means that no engine or fuel supply components are jettisoned during takeoff and the climb to orbit. Space is recognized as beginning at an altitude of 100 km (62 miles). The present invention relates to travel to orbital altitudes of about 120 to 500 km or more where conditions of microgravity exist. The engine system of the present invention can be utilized at speeds below hyper-sonic speeds (i.e., at speeds below about Mach 9).

Figure 1B:
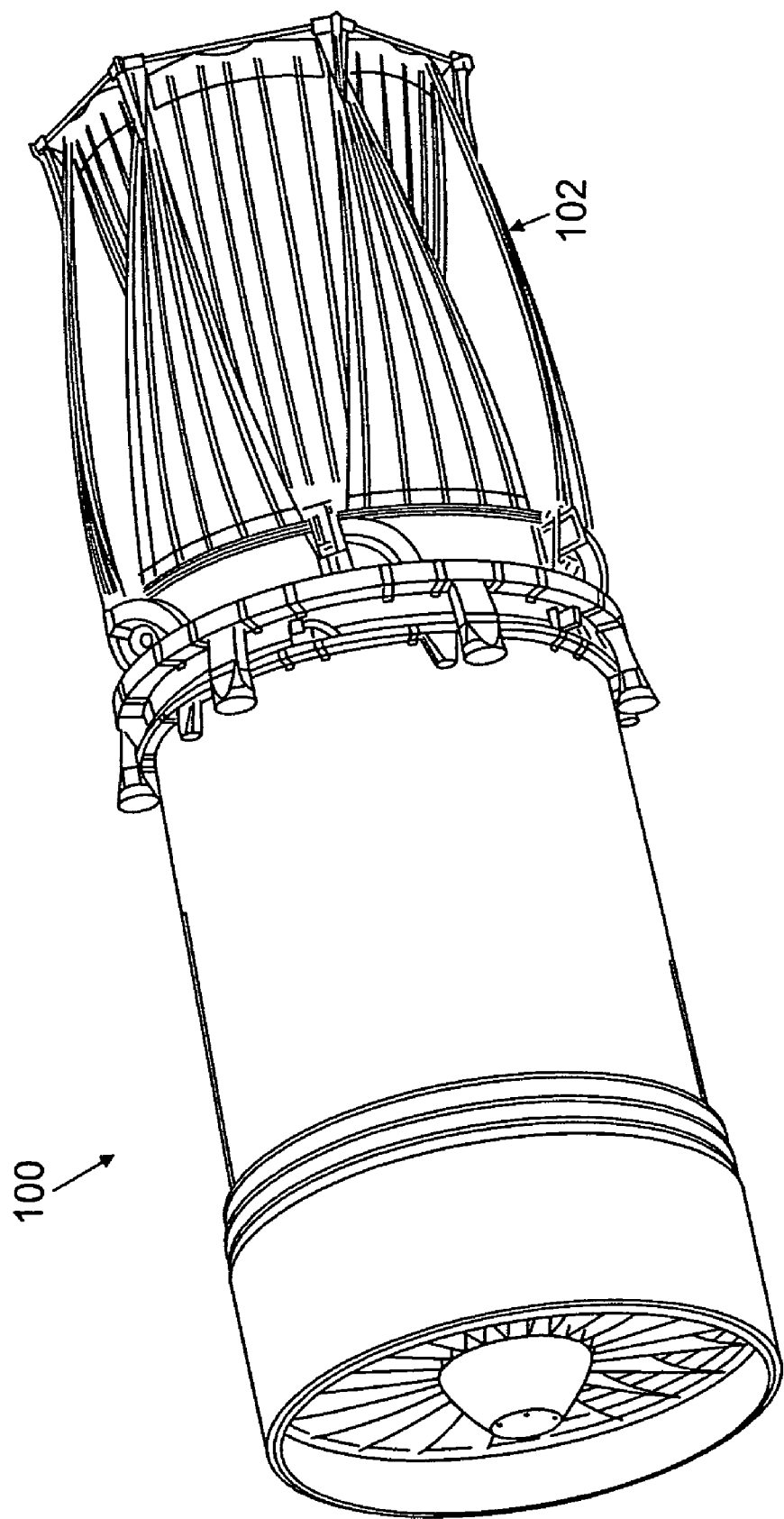
FIG. 1B is a perspective view of the engine system of FIG. 1A configured for non-airbreathing operation.

FIGS. 1A and 1B are perspective views of an engine system 100 that includes a convertible nozzle and ejector duct assembly 102 that can be selectively moved between open and closed positions. In FIG. 1A, the nozzle and ejector duct assembly 102 is in an open position suitable for airbreathing operation of the engine system 100. In FIG. 1B, the nozzle and ejector duct assembly 102 is in a closed position suitable for non-airbreathing operation of the engine system 100.

Figure 2:
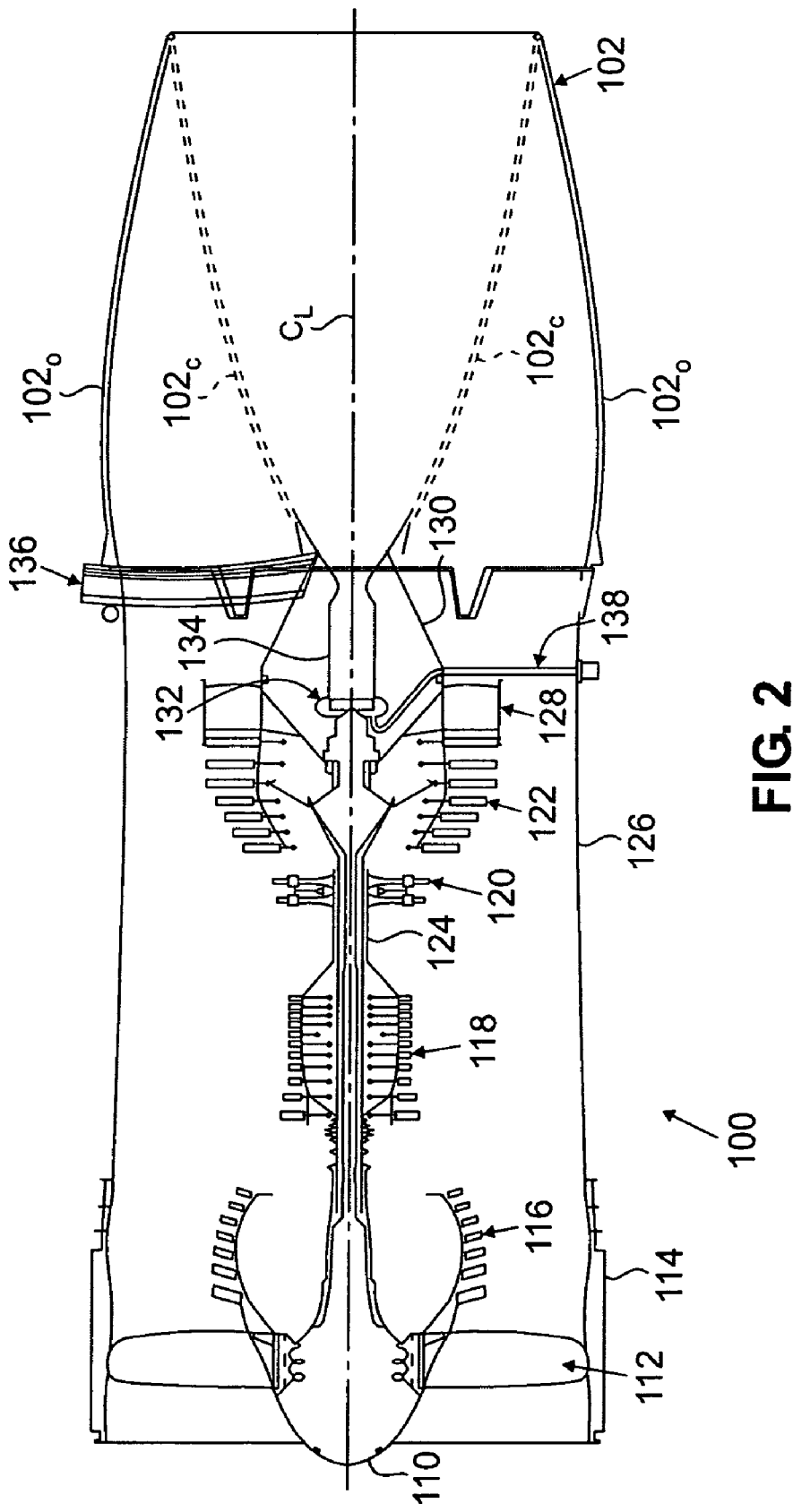
FIG. 2 is a schematic representation of the engine system of FIGS. 1A and 1B.

FIG. 2 is a schematic representation of the engine system 100, which generally includes a gas-turbine engine assembly, a rocket engine assembly, and a convertible nozzle and ejector duct assembly 102.

The gas-turbine engine assembly can be a conventional gas-turbine engine, for example, a PW4000 family aircraft engine available from Pratt & Whitney, East Hartford, Conn. The gas-turbine engine assembly includes a nosecone 110, a fan 112, a fan containment structure 114, a low-pressure compressor subassembly 116, a high-pressure compressor subassembly 118, a high-pressure turbine subassembly 120, a low-pressure turbine subassembly 122, a shaft assembly 124 positioned at an engine centerline $C_L$, a bypass duct 126, and a turbine exhaust case 128. A tailcone portion 130 is located at the aft end of the gas turbine engine assembly, adjacent to the turbine exhaust case 128.

The rocket engine assembly can be a conventional rocket engine, for example a RL60 or RL10B-2 cryogenic rocket engine, available from Pratt & Whitney. The rocket engine assembly is mounted at the tailcone portion 130 of the gas-turbine engine, along the engine centerline $C_L$, and includes an injector assembly 132 and converging-diverging combustion chamber 134.

Two strut assemblies are connected to the rocket engine assembly. A first strut assembly 136 (also called the J-strut assembly) is connected relative to an aft portion of rocket engine assembly. A second strut assembly 138 (also called the I-strut assembly) is connected relative to a forward portion of the rocket engine assembly. The strut assemblies 136 and 138 are described in more detail below.

The convertible nozzle and ejector duct assembly 102 is shown in two positions: an open position $102_o$ and a closed position $102_c$ (shown in phantom). In the open position $102_o$, the assembly 102 forms a portion of an ejector duct for the gas-turbine engine assembly for airbreathing operation of the engine system 100. Movable nozzle segments of the assembly 102 are operatively engaged with the first strut assembly 136, which drives and guides those movable segments. In the closed position $102_c$, the assembly 102 engages with the combustion chamber 134 of the rocket engine assembly to form a diverging nozzle suitable for non-airbreathing operation of the engine system 100.

Figure 3:
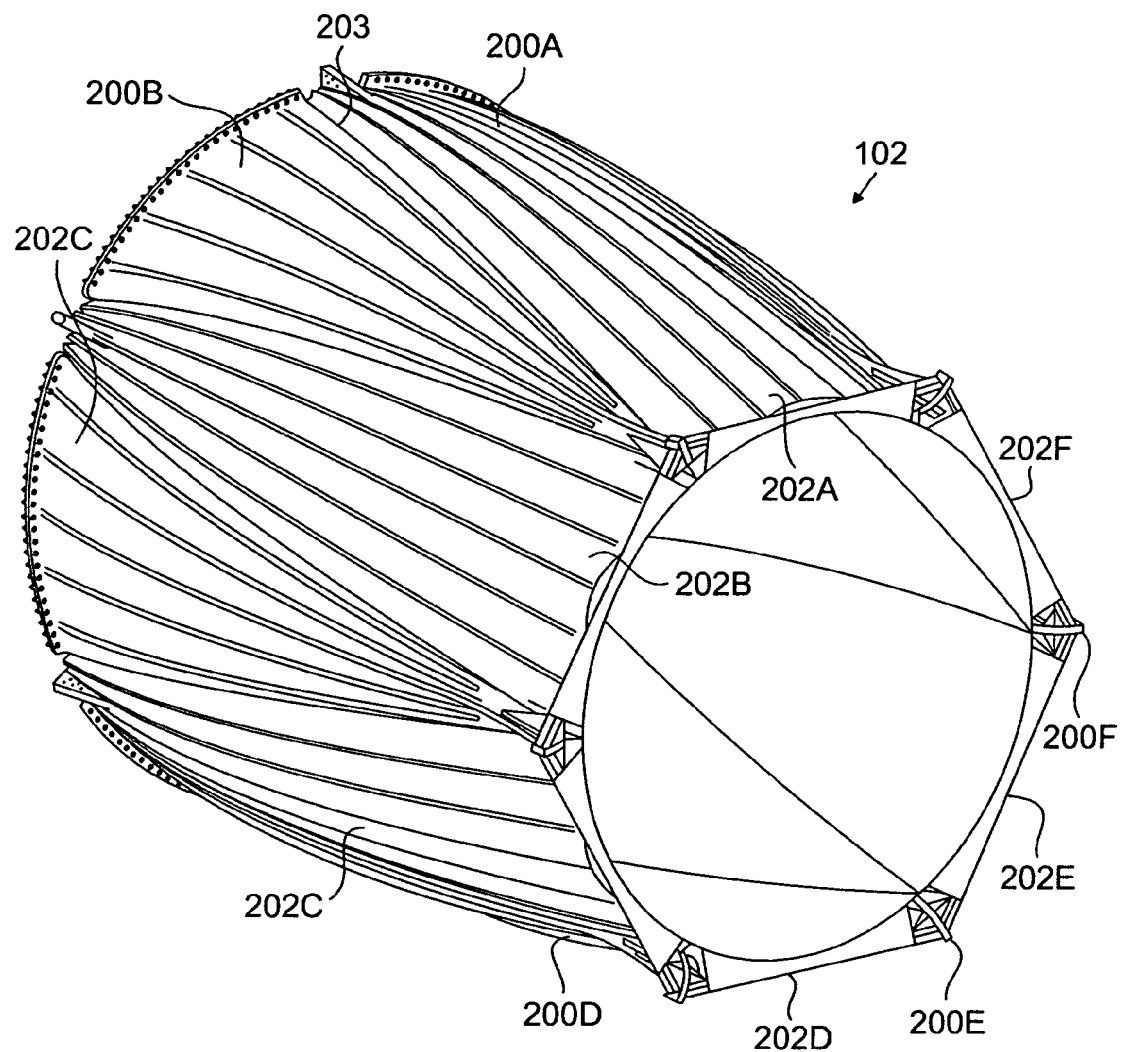
FIG. 3 is a perspective view of a convertible nozzle and ejector assembly.

FIG. 3 is a perspective view of the convertible nozzle and ejector assembly 102 in an open position. The convertible nozzle and ejector assembly 102 includes an ejector duct segment subassembly 200 made up of a plurality of ejector duct segments 200A-200F. Each ejector duct segment 200A-200F is fixed relative to an airframe anchor location of the engine system 100, meaning each segment 200A-200F is fixed relative to the frame of the vehicle in which the engine system 100 is installed. The convertible nozzle and ejector assembly 102 further includes a nozzle segment subassembly 202 made up of a plurality of movable nozzle segments 202A-202F.

Each of the ejector duct segments 200A-200F can have a side portion surface shape that is formed by rotating an edge 203 of a nozzle segment 202A-202F about the engine centerline $C_L$. This allows the nozzle segments 202A-202F to mate with their adjacent ejector duct segments 200A-200F in an open position. The interior surface of ejector duct segments 200A-200F can have a contoured surface for aerodynamic airbreathing operation between their 203 side surfaces.

As shown in FIG. 3, the ejector duct segment subassembly 200 and the nozzle segment subassembly 202 mate together when in an open position. Sealed, mating arrangements of the assembly 102 components is facilitated by maintaining the edges of the ejector duct segments 200A-200F in fixed positions. Although it should be recognized that in further embodiments, portions of the ejector duct segments 200A-200F can be movable to facilitate transitioning the assembly 102 between open and closed positions, as-will be explained further below.

In one embodiment, the convertible nozzle and ejector assembly 102 defines a nearly-circular nozzle exit area of about 35,758.63 cm$^2$ (5,542.6 in$^2$). It should be recognized that in further embodiments, the particular shape and size of the nozzle exit area defined by the assembly 102 can vary as desired.

Figure 4A:
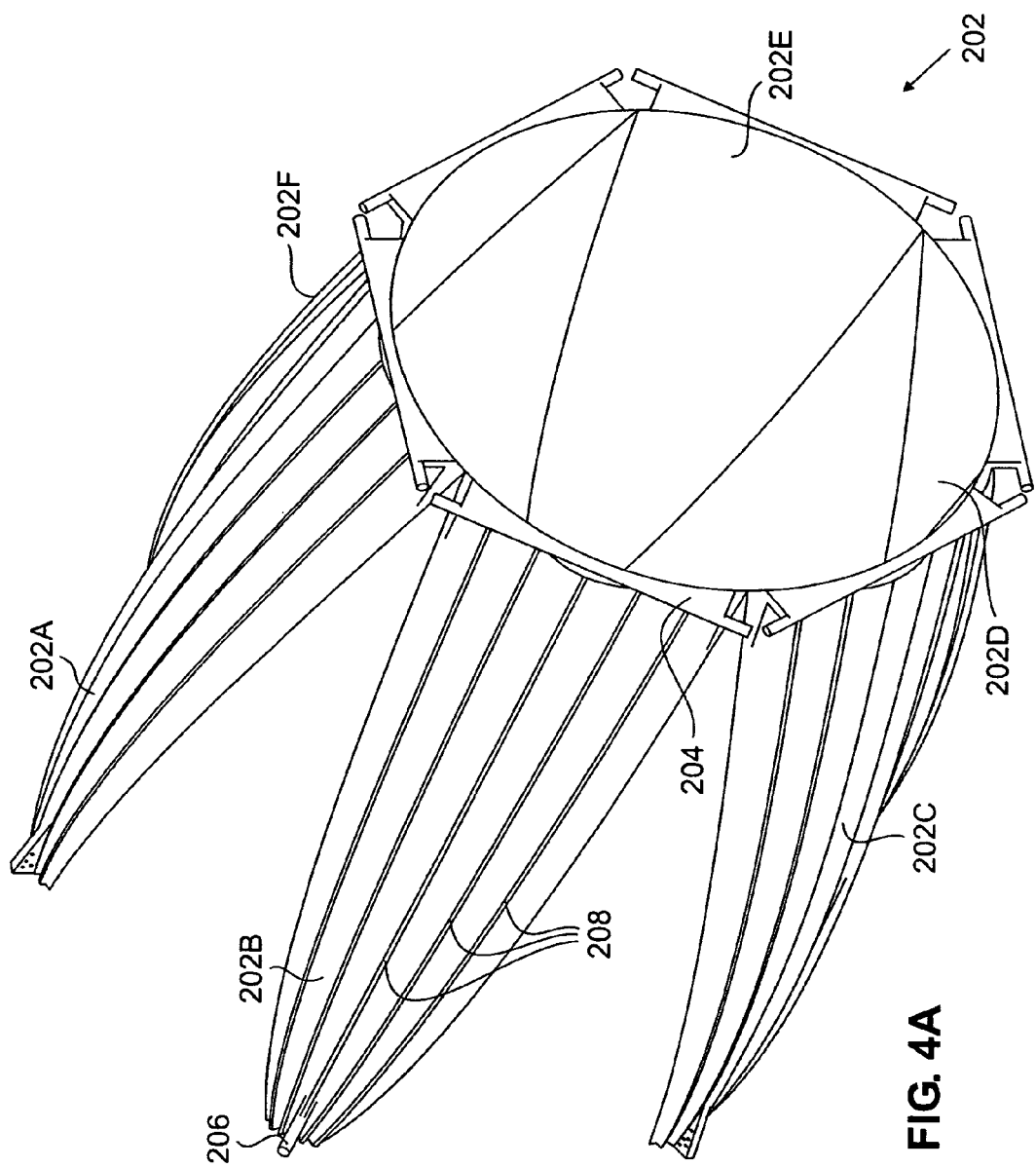
FIGS. 4A and 4B are perspective views of a nozzle segment assembly in an open position and a closed position, respectively.
Figure 4B:
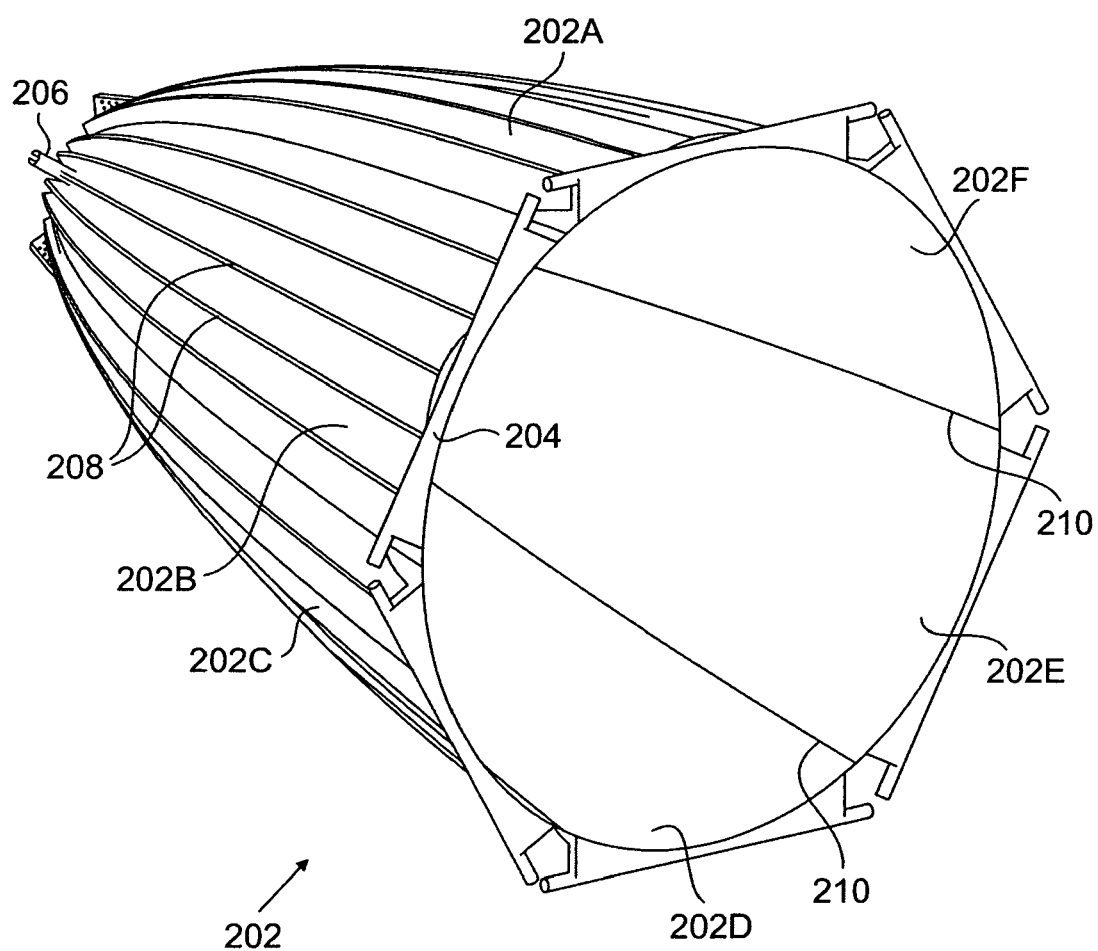

FIGS. 4A and 4B are perspective views of the nozzle segment assembly 202 in an open position and a closed position, respectively. Each of the nozzle segments 202A-202F includes a pivot support 204 at its aft end, a retainer assembly 206 at its forward end, and can include strengthening structures 208 between its forward and aft ends (reference numbers for subcomponents of nozzle segments 202A and 202C-202F have been omitted in FIGS. 4A and 4B for clarity). Each nozzle segment 202A-202F has a bell-shaped interior surface for rocket engine operation and is narrower at its forward end than at its aft end.

The pivot support 204 is designed to pivotally engage with a pivot mounting bracket (see FIG. 5) to support the aft end of each nozzle segment 202A-202F while permitting movement of the forward end of the nozzle segments 202A-202F. The retainer assembly 206 (see also FIG. 12) is designed to operatively engage with the first strut assembly 136 (see FIG. 5) to guide the forward end of each nozzle segment 202A-202F as it moves between open and closed positions. The strengthening structures 208 can be external structures as shown in FIGS. 4A and 4B or can be internal structures. The particular shape and configuration of the strengthening structures will vary as desired, and can include rib-like formations that increase strength and rigidity while helping to limit the mass of each nozzle segment 202A-202F.

In the closed position, as shown in FIG. 4B, adjacent nozzle segments 202A-202F meet at joint locations 210. The joint locations 210 are each located in planes that contain the engine centerline $C_L$ (see FIG. 2), and a seal can be formed at each joint location 210 between the adjacent nozzle segments 202A-202F.

Figure 5:
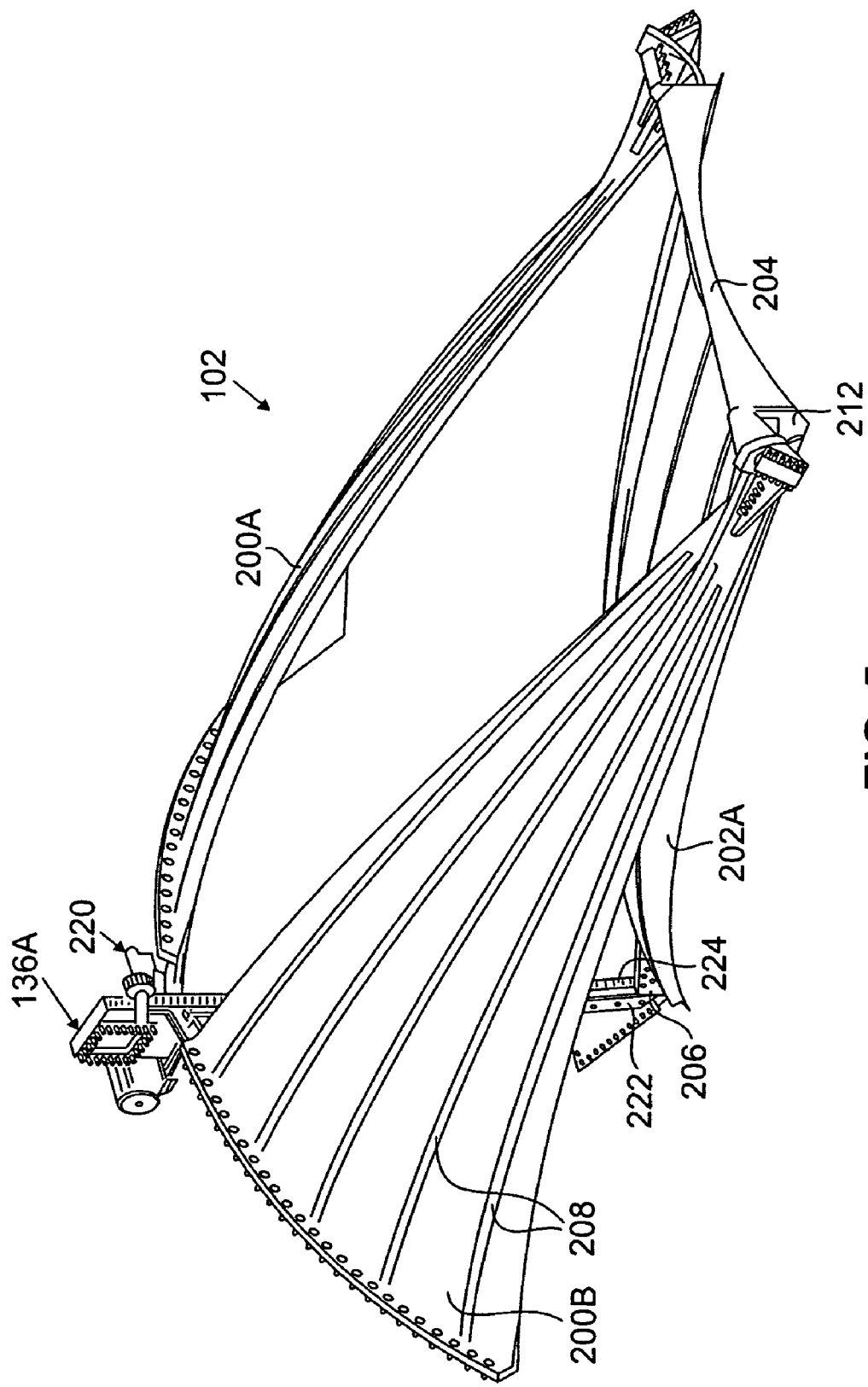
FIG. 5 is a perspective view of a portion of the convertible nozzle and ejector assembly in a closed position.

FIG. 5 is a perspective view of a portion of the convertible nozzle and ejector assembly 102 in the closed position. As shown in FIG. 5, each ejector duct segment 200A-200F (only segments 200A and 200B are shown in FIG. 5) includes strengthening structures 208 similar to those on the nozzle segments 202A-202F described above. Moreover, each ejector duct segment 200A-200F has a pivot mounting bracket 212 at its aft end for pivotally supporting portions of adjacent nozzle segment pivot supports 204. A first strut assembly 136 (see also FIGS. 9 and 10) is located at the forward end of the convertible nozzle and ejector duct assembly 102 (only one strut 136A is shown in FIG. 5). The strut 136A is fixed relative to the ejector duct subassembly 200, and therefore is fixed relative to an airframe of a vehicle in which it is installed.

Figure 11:
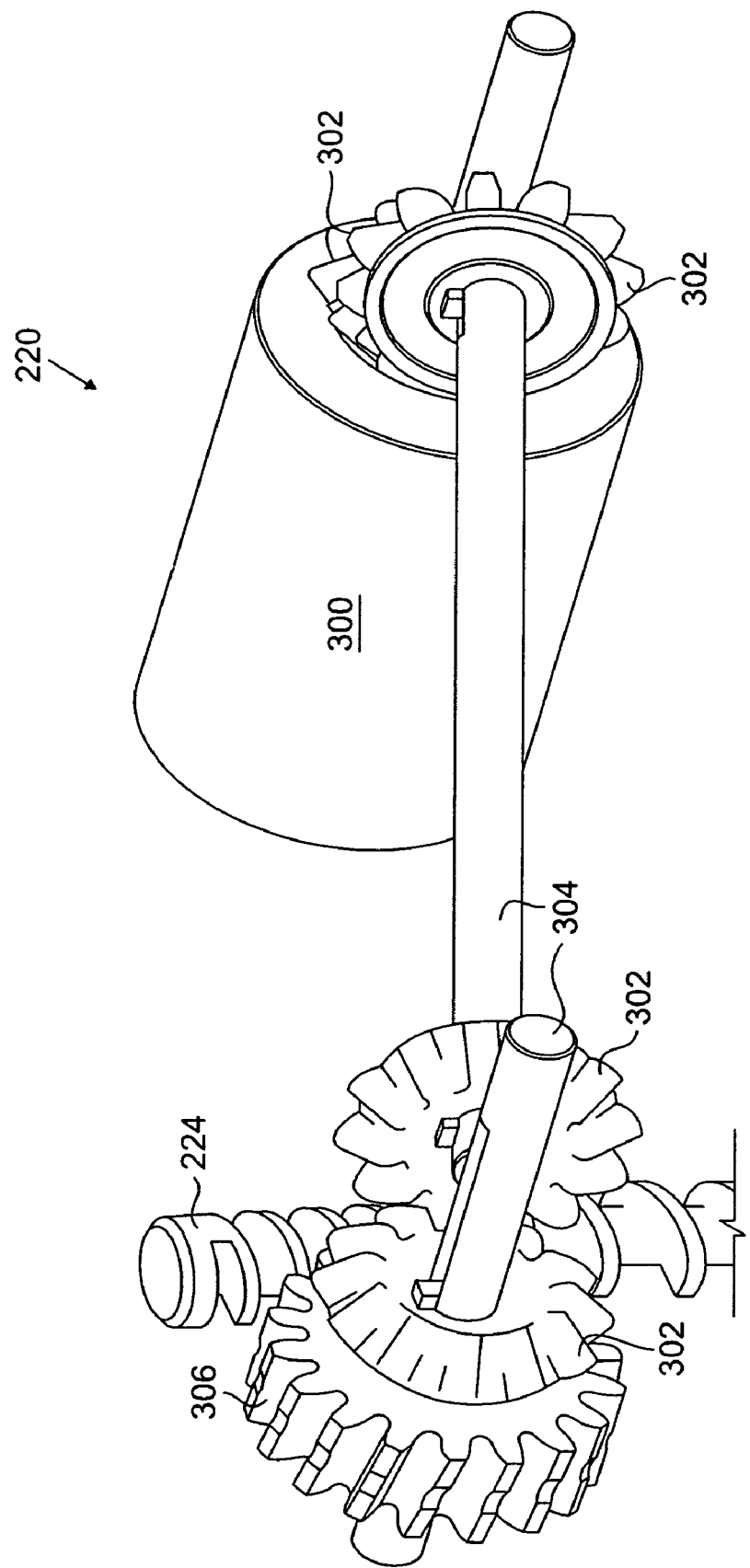
FIG. 11 is a perspective view of an actuator assembly.

An actuator assembly 220 is provided adjacent to the first strut assembly 136 for providing a driving force to move each of the nozzle segments 202A-202F (see also FIG. 11). The actuator assembly can be mounted at an outer end of each strut assembly 136, that is, at an end spaced furthest from the engine centerline $C_L$. A guide assembly 222 is located along a trailing edge of each strut in the strut assembly 136. The retainer assemblies 206 of the nozzle segments 202A-202F engage and retain the guide assemblies 222, such that the forward ends of the movable nozzle segments 202A-202F can be guided along the trailing edges of the respective struts of the first strut assembly 136.

A flexible, screw-type drive shaft 224 is supported adjacent to each guide assembly 222. at the trailing edge of each strut in the first strut assembly 136. The drive shafts 224 are positioned within the guide assemblies 222. Each drive shaft 224 is connected to one of the actuator assemblies 220 and is engaged with the retainer assembly 206 of the corresponding nozzle segment 202A-202F. In this way, force generated by the actuator assembly 220 can be transmitted to the drive shaft 224 to move the nozzle segments 202A-202F between the open and closed positions, with the retainer assemblies 206 moving along the paths formed by the guide assemblies 222. It should be understood that the particular flexible drive shaft 224 described above is provided merely by way of example, and other types of mechanisms can be used. For instance, a chain-drive system can be used instead of a flex-drive system.

In order to better understand the arrangement of the convertible nozzle and ejector duct assembly 102, it is helpful to understand the components of the rocket engine assembly and their relative positioning with respect to subassemblies of the convertible nozzle and ejector duct assembly 102. This facilitates an understanding of how the convertible nozzle and ejector duct assembly 102 moves between open and closed positions, which in turn, facilitates an understanding of how the engine system 100 enables both airbreathing and non-airbreathing operation.

Figure 6:
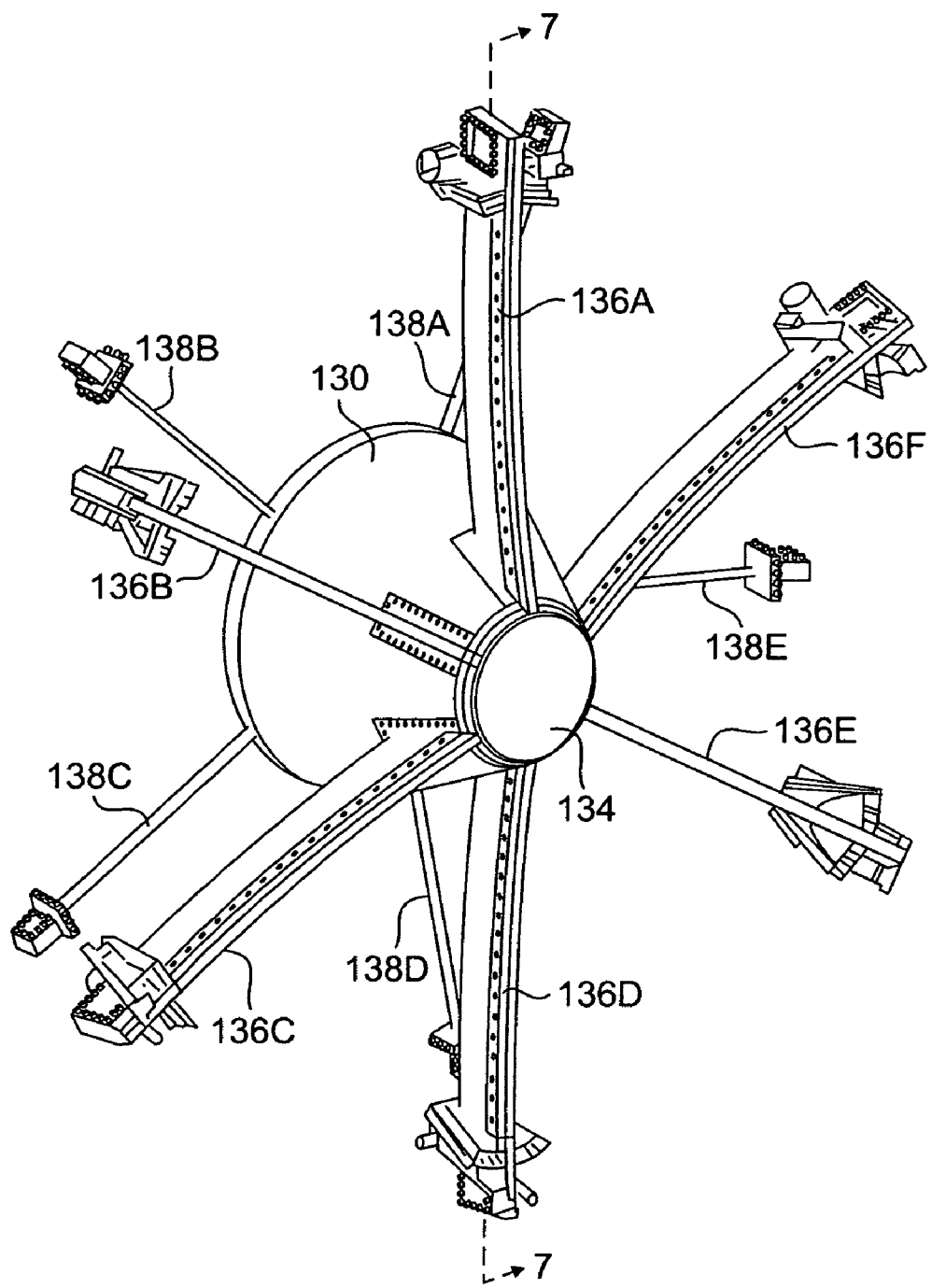
FIG. 6 is a perspective view of a tailcone assembly having multiple strut assemblies attached thereto.
Figure 7:
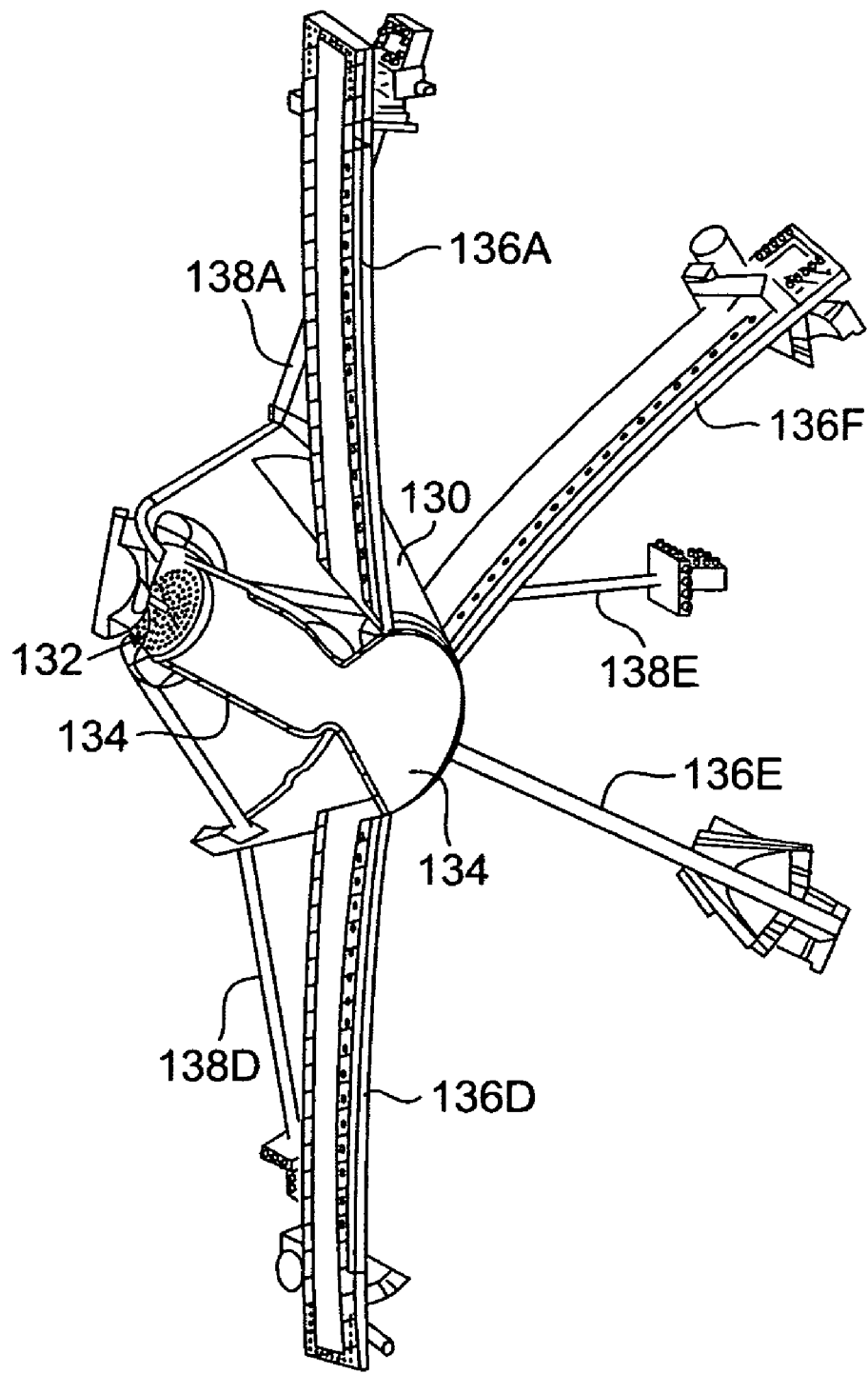
FIG. 7 is a cross-sectional view of the tailcone assembly of FIG. 6, as viewed along line 7-7.

FIG. 6 is a perspective view of a tailcone assembly that includes the first strut assembly 136 and the second strut assembly 138 mounted at the tailcone portion 130 of the engine system 100. FIG. 7 is a cross-sectional view of the tailcone assembly 130, as viewed along line 7-7 of FIG. 6. As shown in FIGS. 6 and 7, the first and second strut assemblies 136 and 138 are secured to the tailcone portion 130 of the engine system 100. The first strut assembly 136 is secured relative to the aft end of the tailcone portion 130, and the second strut assembly 138 is connected relative to the forward end of the tailcone portion 130. The first strut assembly is configured to connect to the rocket combustion chamber 134. The individual struts 136A-136F of the first strut assembly 136 extend radially outward from the tailcone portion 130 and are arranged in a spaced circumferential pattern that corresponds to the location and arrangement of the nozzle segment subassembly 202.

The struts 138A-138E of the second strut assembly 138 are connected to the injector assembly 132 of the rocket engine assembly. The individual struts 138A-138E extend radially outward from the tailcone portion 130 and are arranged in a spaced circumferential pattern that corresponds to the location and arrangement of the airfoils which are part of the turbine exhaust case assembly 128.

Figure 8:
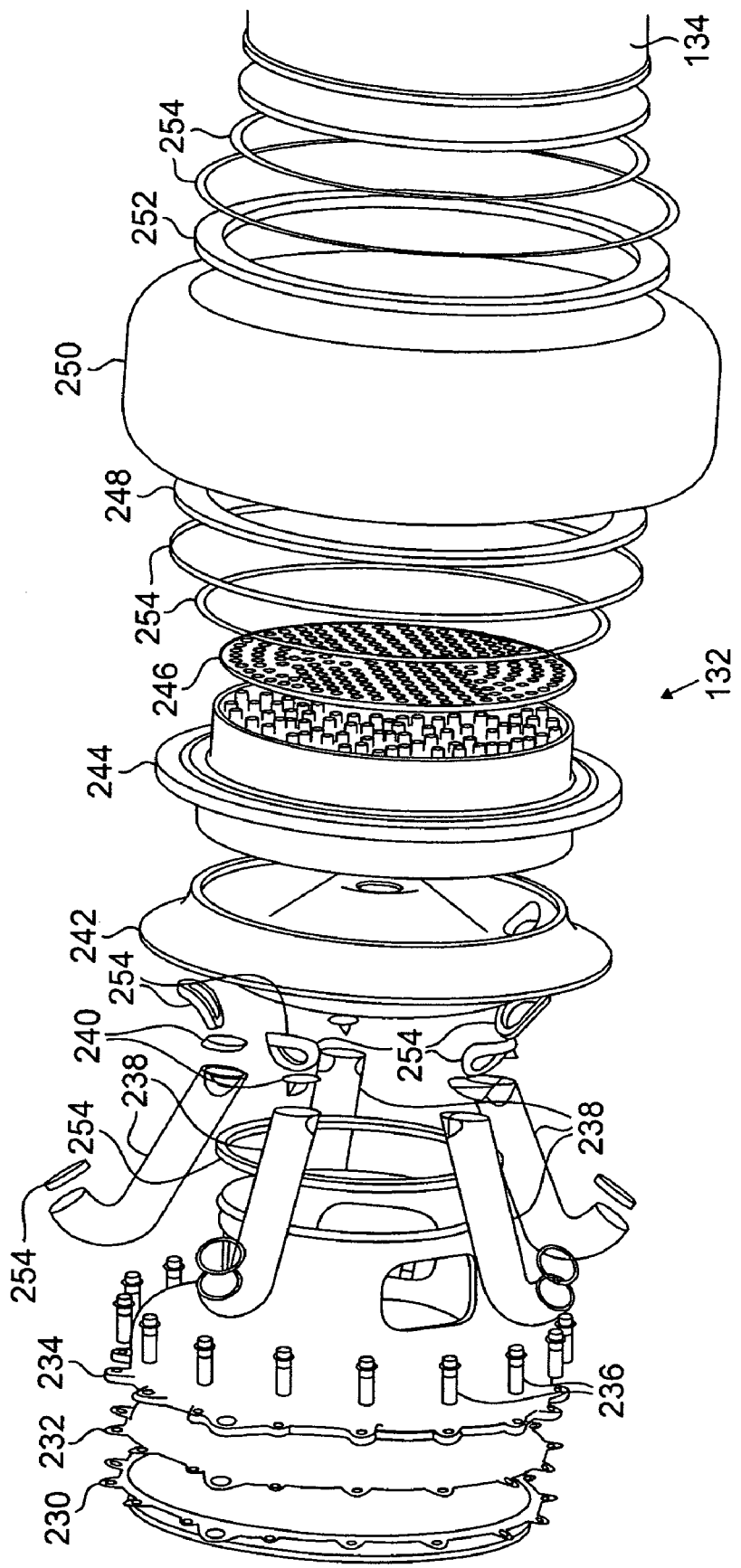
FIG. 8 is an exploded perspective view of a portion of a rocket engine assembly.

FIG. 8 is an exploded perspective view of a portion of the rocket engine assembly. The rocket engine assembly includes a low pressure turbine bearing compartment cover 230 (which is also part of the turbine exhaust case assembly 128), a thermal protection dome 232, a combustion chamber mount 234, bolt fasteners 236, oxidizer flow turnaround tube assemblies 238, oxidizer flow diverter plates 240, an oxidizer dome 242, an injector body 244 having oxidizer pintles, an injector body face plate 246, a combustion chamber discharge collection manifold exterior closeout ring 248, a combustion chamber discharge outer turn-around manifold 250, and a combustion chamber discharge collection manifold interior close-out ring 252. A portion of the combustion chamber 134 is shown adjacent to the combustion chamber discharge outer turn-around manifold 250. Various components of the rocket engine assembly are secured by welding, and weld beads 254 are shown to represent welded connections.

The rocket engine assembly can be mounted aft of the low pressure turbine assembly 122 of the gas-turbine engine assembly, at the tailcone portion 130. The oxidizer turn-around tube assemblies 238 are each connected to struts of the second strut assembly 138 (see FIGS. 7, 14 and 16), and supply an oxidizer fluid (e.g., liquid oxygen, nitrogen tetroxide, and hydrogen peroxide) to the injector assembly 132.

The rocket engine assembly, viewed in isolation, operates in a conventional manner well known to those of ordinary skill in the art. Likewise, the gas-turbine engine assembly (see FIG. 2), viewed in isolation, operates in a conventional manner well known to those of ordinary skill in the art.

Figure 9:
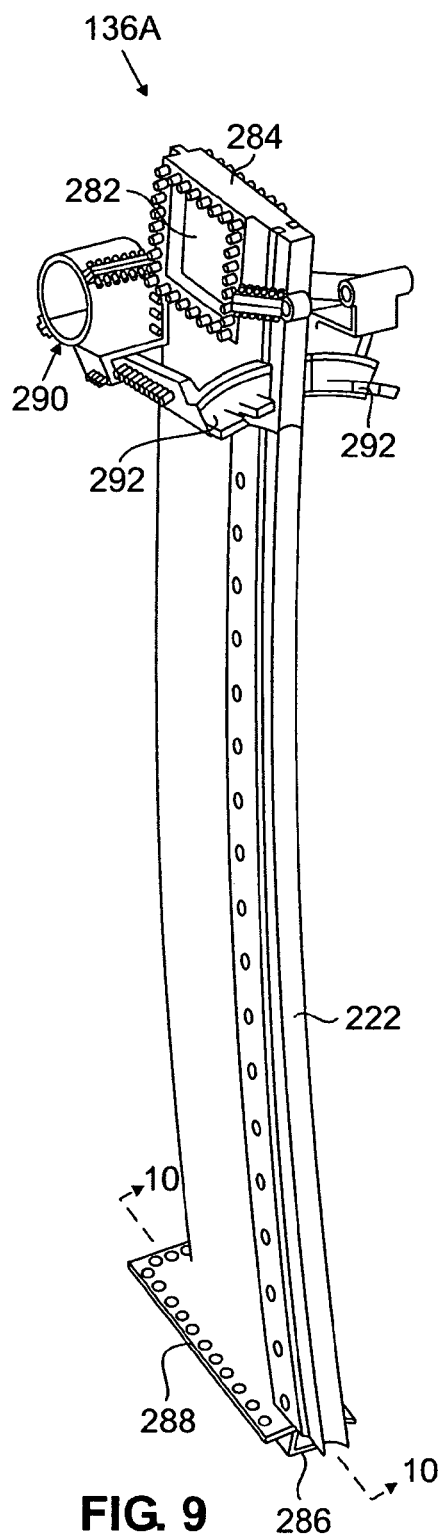
FIG. 9 is a perspective view of a strut.
Figure 10:
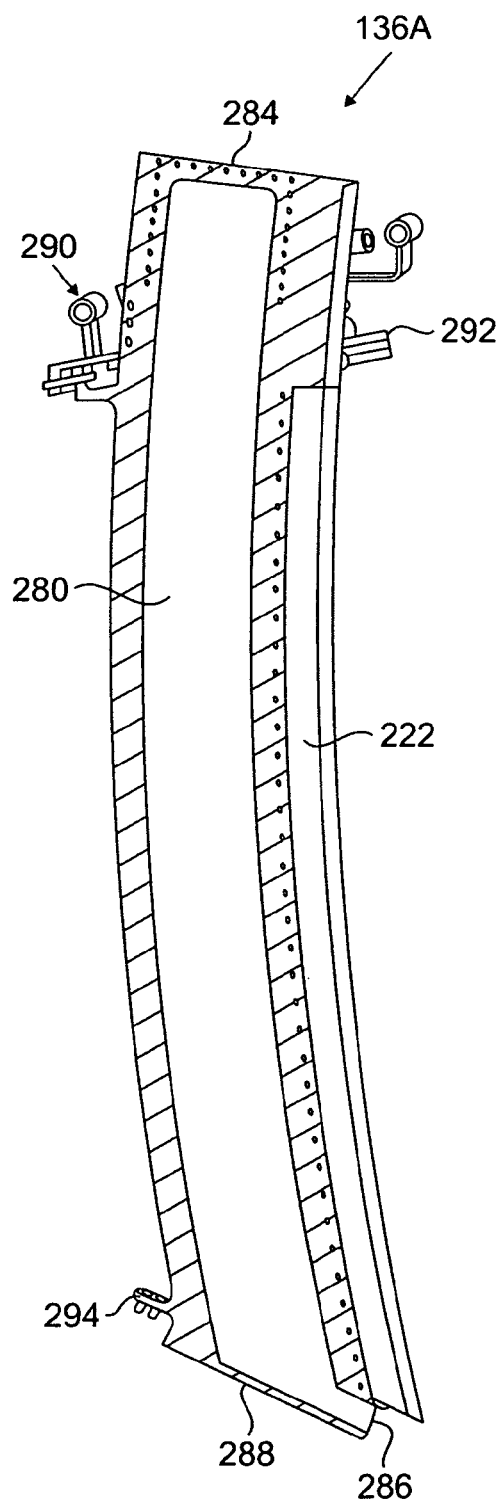
FIG. 10 is a cross-sectional view of the strut of FIG. 9, as viewed along line 10-10.

FIG. 9 is a perspective view of the strut 136A from the first strut assembly 136. FIG. 10 is a cross-sectional view of the strut 136A, as viewed along line 10-10 of FIG. 9. Other struts 136B-136F of the strut assembly 136, shown in FIG. 6, are substantially identical to the strut 136A. The strut 136A is an elliptically-shaped (in a direction tangential to the engine's centerline $C_L$) hollow member having an interior cavity 280. The interior cavity 280 has an inlet opening 282 near an outer end 284 of the strut 136A, and an outlet opening 286 near an inner end 288 of the strut 136A. The strut 136A performs multiple functions, including assisting in mechanically moving the convertible nozzle and ejector duct assembly 102 between open and closed positions, providing structural support to the rocket engine assembly, and providing a fuel supply path to the rocket engine assembly.

The inlet opening 282 permits the introduction of a fluid, such as a liquid fuel, to the strut 136A. The inlet opening 282 is connected to a fuel supply manifold (see FIGS. 1A, 1B and 13) to permit a suitable rocket fuel (e.g., liquid hydrogen, a conventional kerosene or kerosene-based rocket fuel, etc.) to be supplied to the strut 136A from vehicle fuel tanks (not shown). The outlet opening 286 allows fluid to pass out of the strut 136A to conventional cooling channels formed in the walls of the rocket combustion chamber 134. The outlet opening 286 is positioned adjacent to the aft, diverging portion of the rocket combustion chamber 134 (see FIGS. 2, 6, 7 and 16).

The strut 136A has an actuator support structure 290 near its outer end 284 for mounting the actuator assembly 220 to the strut 136A, and a nozzle segment support 292 near its outer end 284 for supporting the forward ends of adjacent nozzle segments 202 when in the open position. The strut 136A also has an inner support flange 294 to facilitate securing the strut 136A to the tailcone portion 130 of the engine system 100. The strut 136 must have substantial structural support, because it is located within the exhaust path of the gas-turbine engine assembly. Bolts and welding are used to structurally secure the strut 136A, as well as to provide suitable seals to prevent leakage of fluid passing through the interior cavity 280.

Fuel pumped through the strut 136A cools the strut 136A, to prevent damage from high temperatures generated within the engine system 100. Moreover, the rocket combustion chamber 134 utilizes conventional fuel coolant paths in the chamber walls (not specifically shown), and the fuel can pass from the outlet opening 286 to the fuel coolant paths of the rocket combustion chamber 134.

The guide assembly 222 is positioned at the trailing edge of the strut 136A. The strut 136A has an arcuate shape along its trailing edge, between its outer and inner ends 284 and 288, in order to provide an arcuate path for the forward end of the corresponding segment of the pivoting nozzle segment subassembly 202.

It should be recognized that the particular size and shape of the strut 136 will vary depending on the particular application. For example, the elliptical shape of the strut 136 can form a conventional airfoil shape of desired aerodynamic characteristics.

FIG. 11 is a perspective view of the actuator assembly 220, which is used to provide a driving force to move the nozzle segment subassembly 202. In the illustrated embodiment, the actuator assembly 220 includes a rotary-output motor 300 (e.g., an electric motor having a suitable torque output), a number of bevel gears 302, a number of torque transmission shafts 304, a drive shaft engagement gear 306, and the flexible drive shaft 224. The actuator assembly 220 is configured to transmit torque that selectively rotates the drive shaft 224.

Figure 12:
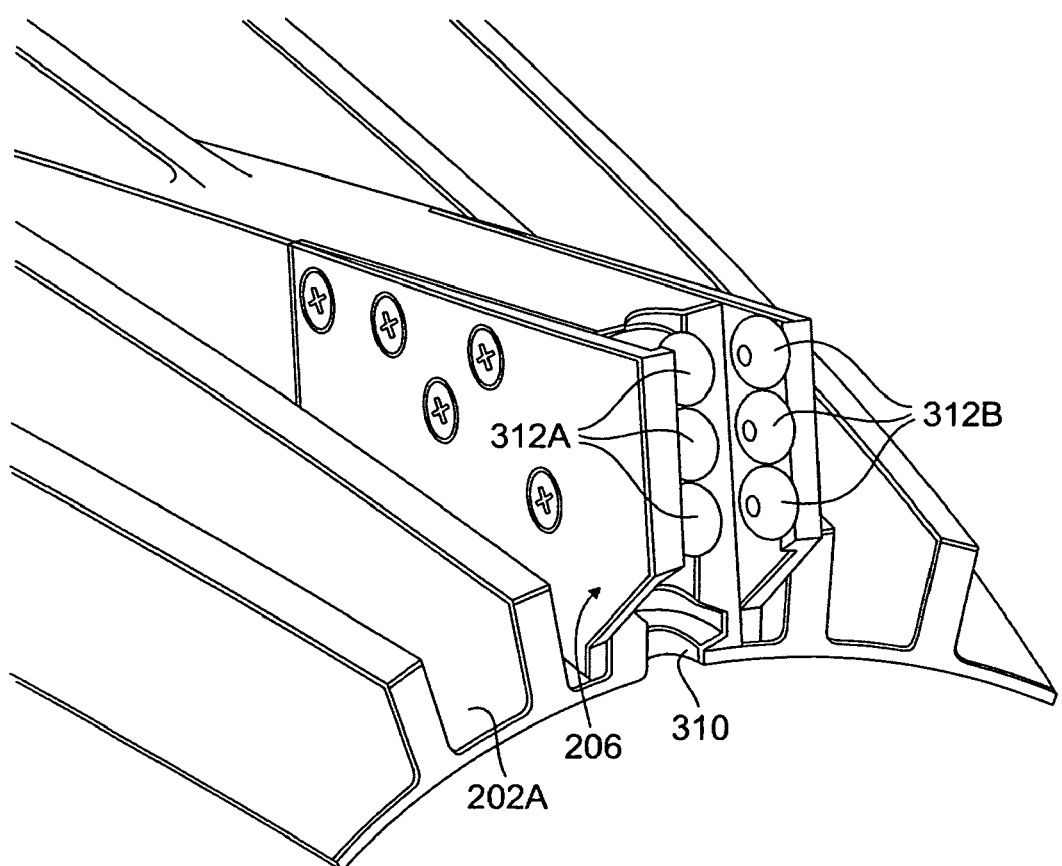
FIG. 12 is a perspective view of a retainer assembly attached to a nozzle segment.

FIG. 12 is a perspective view of the retainer assembly 206 attached to the forward end of the nozzle segment 202A. The retainer assembly 206 includes a drive shaft engagement groove 310 and a pair of opposed wheel assemblies 312A and 312B. The drive shaft engagement groove 310 engages the drive shaft 224, and is urged outward (to move the nozzle segment 202A toward an open position) or inward (to move the nozzle segment 202A toward a closed position) due to contact with threads of the drive shaft 224 as the drive shaft 224 is rotated by the motor 300 and gearing 302, 304 and 306.

The opposed wheel assemblies 312A and 312B engage the guide assembly 222 to help guide the nozzle segment 202A along a desired path between its open and closed positions. Moreover, the opposed wheel assemblies 312A and 312B and the guide assembly 222 jointly help maintain engagement of the retainer assembly 206 and the drive shaft 224.

It should be recognized that other types of actuator assemblies 220 can be utilized, such as universal-joint connected gang drive shafts or flexible drive shafts with a single drive motor instead of separate actuator assemblies at each strut assembly 136 and therefore the particular features of the actuator assembly 220 can vary accordingly.

Figure 13:
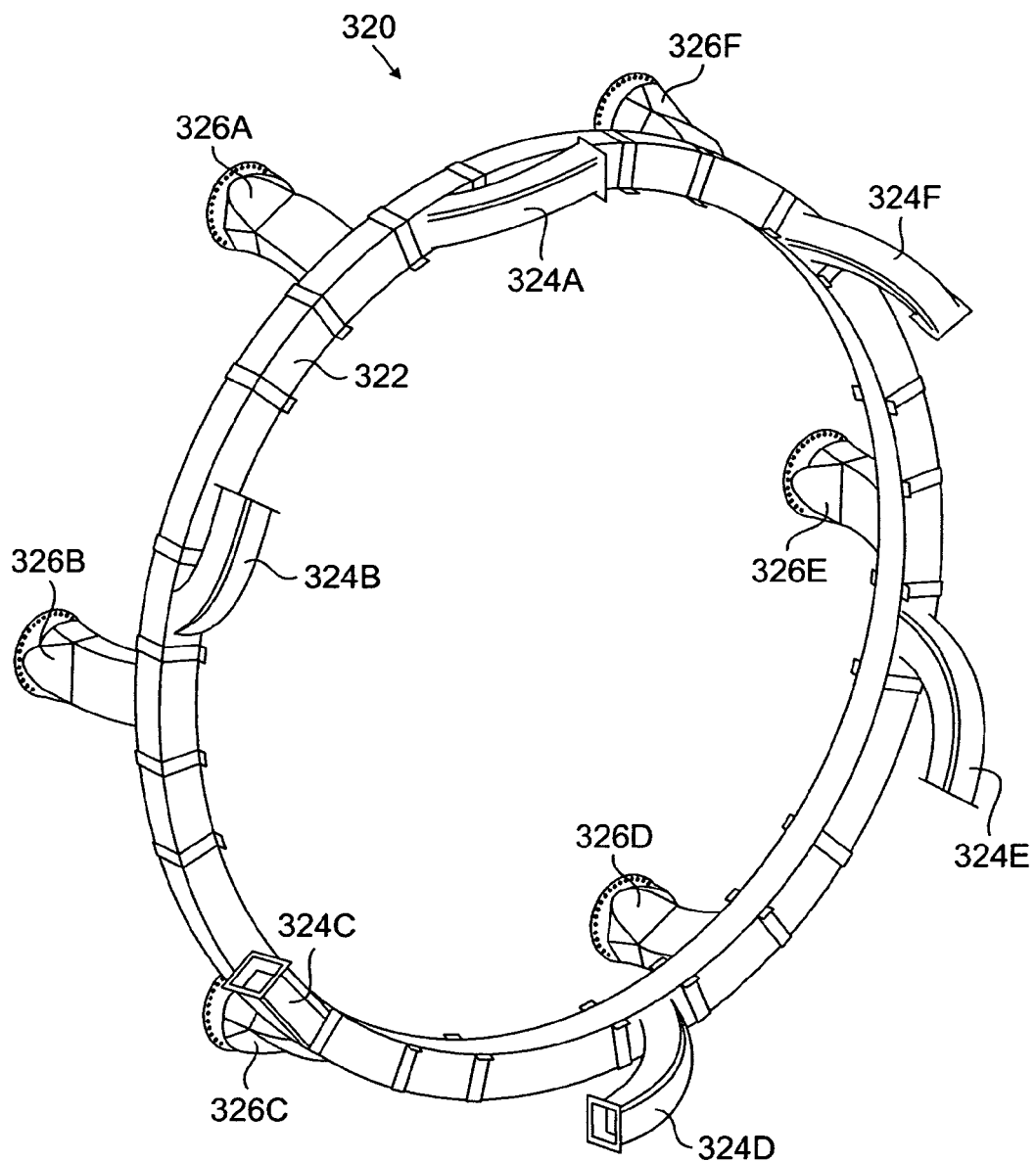
FIG. 13 is a perspective view of a fuel supply manifold.

The first strut assembly 136 functions not only to facilitate mechanically opening and closing the convertible nozzle and ejector duct assembly and structurally supporting the rocket engine assembly, but also to supply fluid, such as fuel, to the rocket engine assembly. Fuel can be supplied to the first strut assembly 136 by a fuel supply manifold. FIG. 13 is a perspective view of a fuel supply manifold 320. The fuel supply manifold 320 has a generally circular body portion 322 that is sized to fit at a circumference of the engine system 100 (see FIG. 1A). A number of supply passage structures 324A-324F extend from the body 322, and are configured for mated, sealed attachment to the fluid inlet openings 282 in the struts 136A-136F of the first strut assembly 136. In addition, inlet flanges 326A-326F are provided to accept fuel pumped to the manifold 320 from a vehicle storage tank.

In further embodiments, other types of fuel supply manifolds can be used. For example, individual supply manifolds can be provided for each strut 136A-136F. Alternatively, a number of fuel supply manifolds can be provided for groups of two or more of the struts 136A-136F.

In addition to fuel, the rocket engine assembly must be supplied with an oxidizer to enable non-airbreathing operation of the engine system 100.

Figure 14:
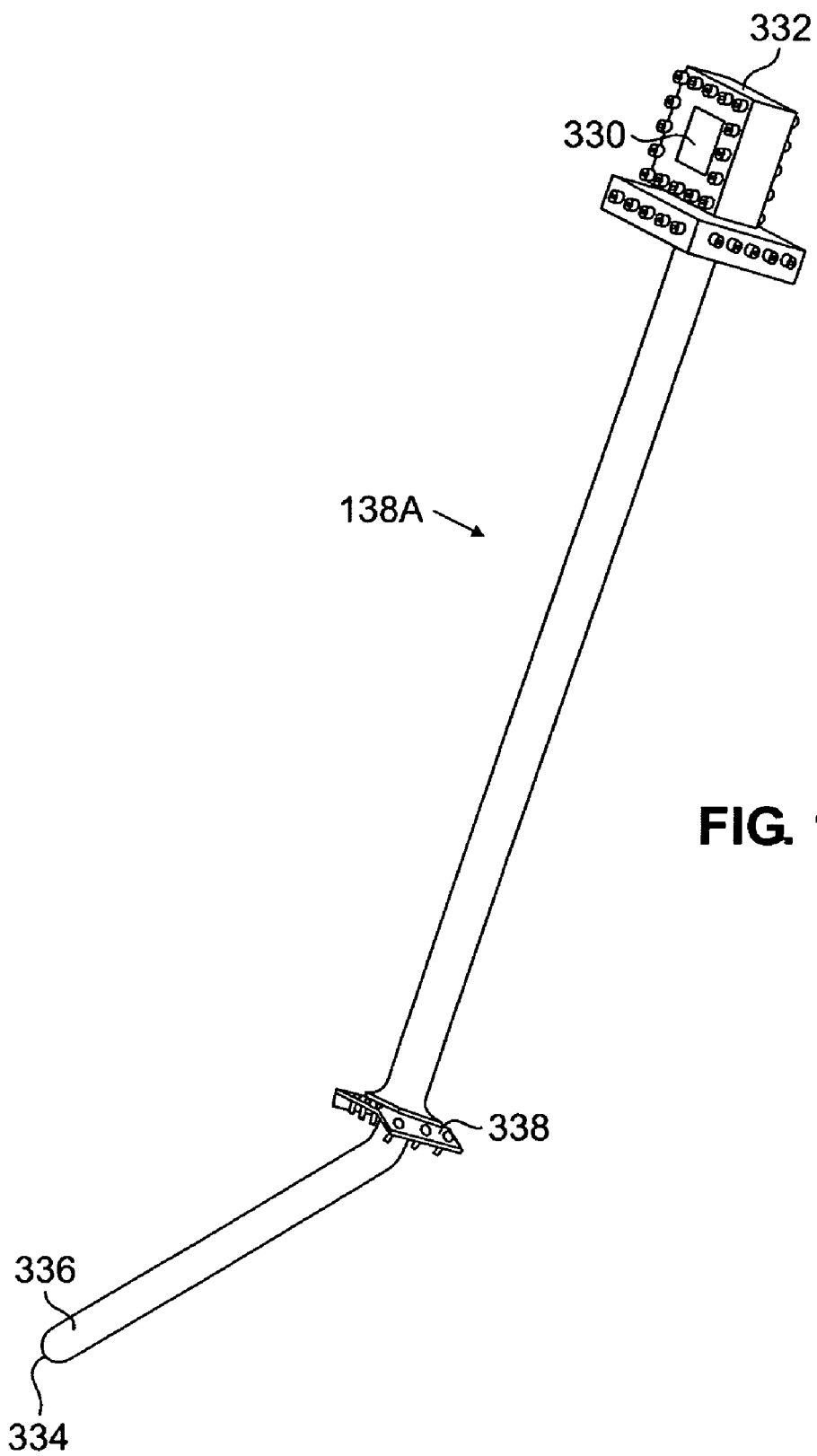
FIG. 14 is a perspective view of another type of strut.

FIG. 14 is a perspective view of the strut 138A from the second strut assembly 138. The strut 138A is substantially similar to the other struts of the second strut assembly 138. The strut 138A is hollow, for providing a fluid path between an inlet opening 330 located at an outer end 332 and an outlet opening 334 located at an inner end 336. The strut 138A forms an oxidizer supply path through a portion of an exhaust path of the gas-turbine engine to supply oxidizer to the injector assembly 132 of the rocket engine assembly. The oxidizer can be a cryogenic fluid, such as liquid oxygen, which can cool the strut 138A. The outlet opening 334 can be welded and sealed to the rocket injector assembly 132, and the inlet opening 330 can be connected to an oxidizer supply manifold (see FIG. 15). A flange 338 is provided at the opposed ends 332 and 336 of the strut 138A, to secure the strut 138A to the tailcone portion 130 of the engine system 100. In further embodiments, the oxidizer can be pumped through walls of the rocket combustion chamber 134 to cool it, rather than using fuel to cool the combustion chamber walls.

The strut 138A can have an airfoil shape, to improve aerodynamic performance. Moreover, the strut 138A can be angled between the flange 338 and the inner end 336 to facilitate attachment between an oxidizer supply manifold and the oxidizer flow turnaround tube assemblies 238, which are part of the injector assembly 132.

Figure 15:
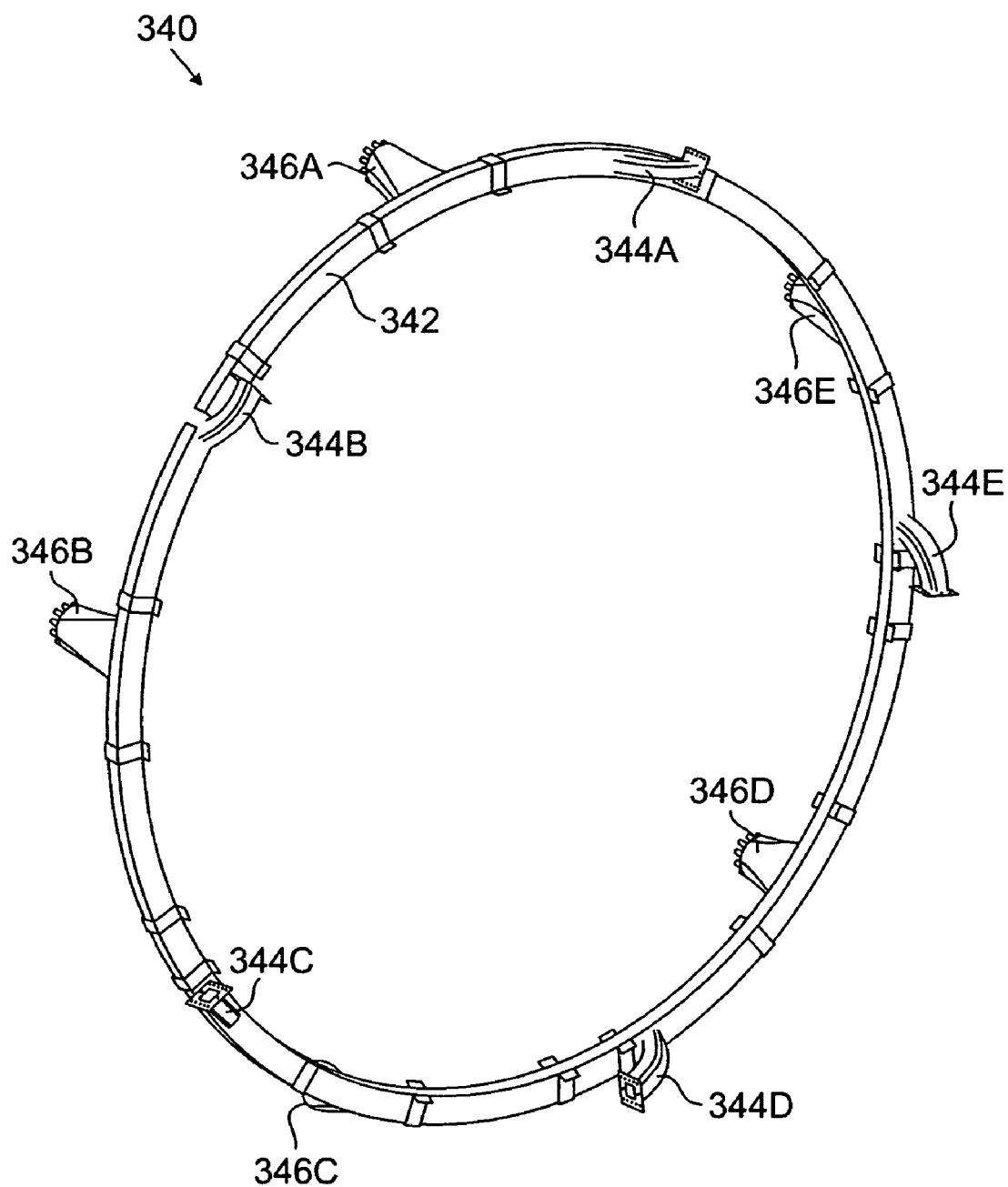
FIG. 15 is a perspective view of an oxidizer supply manifold.

FIG. 15 is a perspective view of an oxidizer supply manifold 340 that includes a generally circular body portion 342, a number of supply passage structures 344A-344E, and a number of inlet flanges 346A-346E. The oxidizer supply manifold 340 is sized to fit at a circumference of the engine system 100 (see FIG. 1A), and accepts oxidizer fluid pumped from vehicle oxidizer tanks (not shown) for delivery to the second strut assembly 138 and the rocket engine assembly.

In further embodiments, other types of oxidizer supply manifolds can be used. For example, individual supply manifolds can be provided for each strut 138A-138E. Alternatively, a number of fuel supply manifolds can be provided for groups of two or more of the struts 138A-138E.

Figure 16:
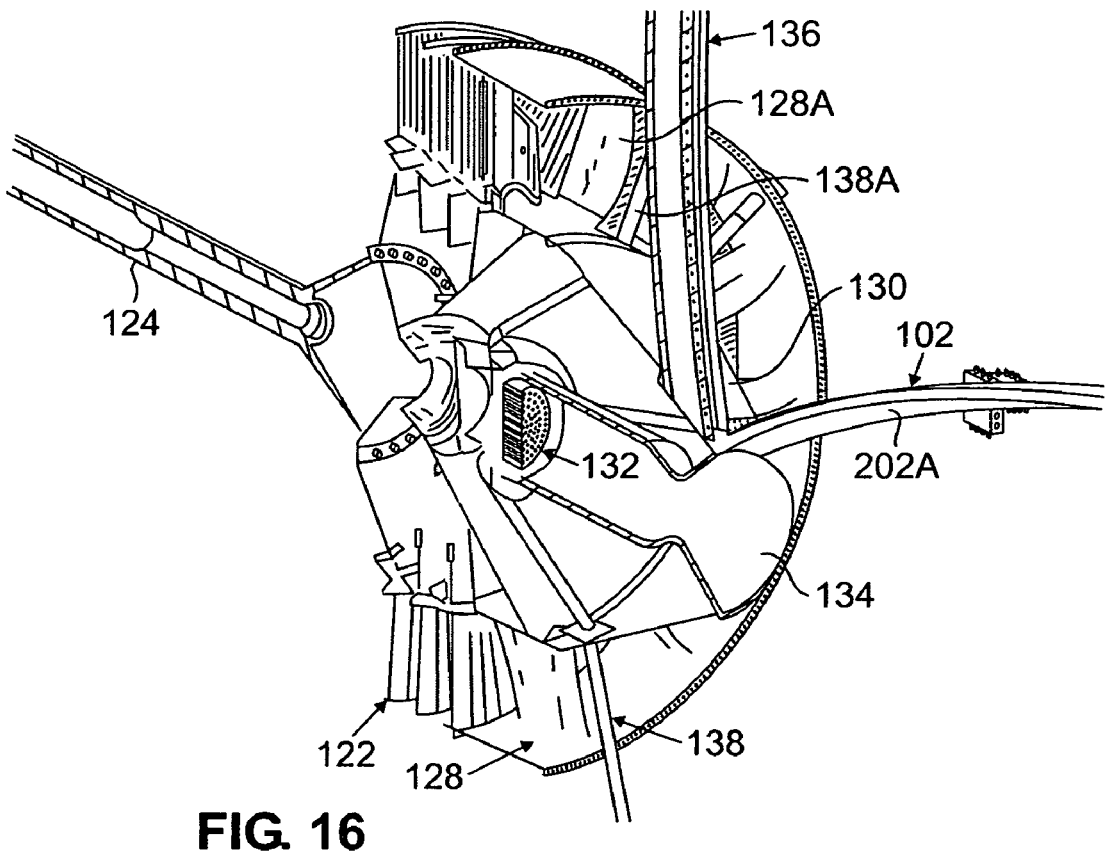
FIG. 16 is a cross-sectional perspective view of an aft portion of the engine system of FIGS. 1A, 1B and 2.

FIG. 16 is a cross-sectional perspective view of an aft portion of the engine system 100, with a portion of the convertible nozzle and ejector duct assembly 102 shown in the closed position. As shown in FIG. 16, it can be understood how the engine system provides fuel and oxidizer for non-airbreathing operation. For airbreathing operation, the gas-turbine engine assembly is utilized to produce thrust, with an exhaust flow passing from the turbine exhaust case 128. It should be noted that the struts of the second strut assembly 138 are located directly aft of airfoils of the turbine exhaust case 128, for example, strut 138A is located aft of turbine exhaust case airfoil 128A. The first and second strut assemblies 136 and 138 are not required to carry fuel and oxidizer during airbreathing operation of the engine system 100. However, in some embodiments, a fluid can be directed through the strut assemblies 136 and 138 to provide cooling.

During non-airbreathing operation, the rocket engine assembly is utilized to produce thrust, with an exhaust flow passing from the rocket combustion chamber 134 located at the tailcone portion 130 of the engine system 100. Fuel is pumped through the first strut assembly 136 to the rocket combustion chamber 134, and oxidizer is pumped through the second strut assembly 138 to the injector assembly 132. The oxidizer and fuel are then combined and burned in a conventional manner.

As discussed above, suitable rocket fuels include conventional liquid hydrogen and kerosene-based rocket fuels. Suitable oxidizers include liquid oxygen, nitrogen tetroxide, and hydrogen peroxide. The gas-turbine engine can use a conventional kerosene or kerosene-based jet fuel. The use of liquid hydrogen presents numerous problems. For instance, liquid hydrogen has a relatively high density, and is carcinogenic. It may be desirable to utilize a single kerosene or kerosene-based fuel for both airbreathing and non-airbreathing operation of the engine system 100, with liquid oxygen used as the oxidizer for non-airbreathing operation.

Figure 17:
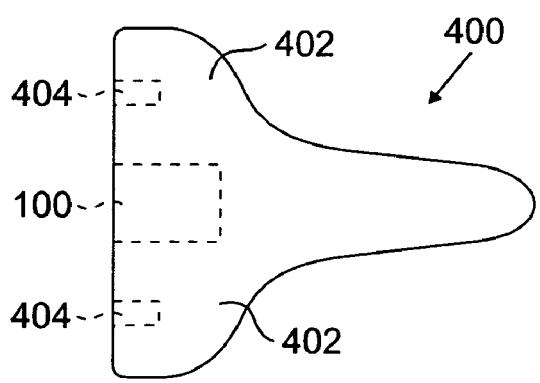
FIG. 17 is a schematic representation of a vehicle utilizing a convertible airbreathing and non-airbreathing engine system.

FIG. 17 is a schematic representation of a vehicle 400 utilizing a convertible airbreathing and non-airbreathing engine system 100. The vehicle 400 includes conventional airfoil wings 402, to enable horizontal takeoff and landing. In further embodiments, the wings 402 can be movable to facilitate various takeoff, flight, orbit, and landing maneuvers. Optional propellant containers 404 are shown mounted at the wings 402 in FIG. 17. These propellant containers 404 (i.e., self-contained propulsion devices) can release a compressed gas to provide thrust during a transition between airbreathing and non-airbreathing operation of the engine system 100 of the vehicle 400. It should be recognized that the vehicle 400 is merely an exemplary embodiment, and the engine system 100 can be utilized with different types of vehicles. Moreover, the placement of the engine system 100 on or in the vehicle can vary.

In view of the discussion provided above with respect to FIGS. 1A-17, the operation of the engine system 100 can be understood in the context of a single-stage-to-orbit flight and landing. The following is a discussion of how the various components of the vehicle 400 work together to provide an integral airbreathing and non-airbreathing engine system 100 that enables horizontal takeoff and horizontal landing.

Figure 18:
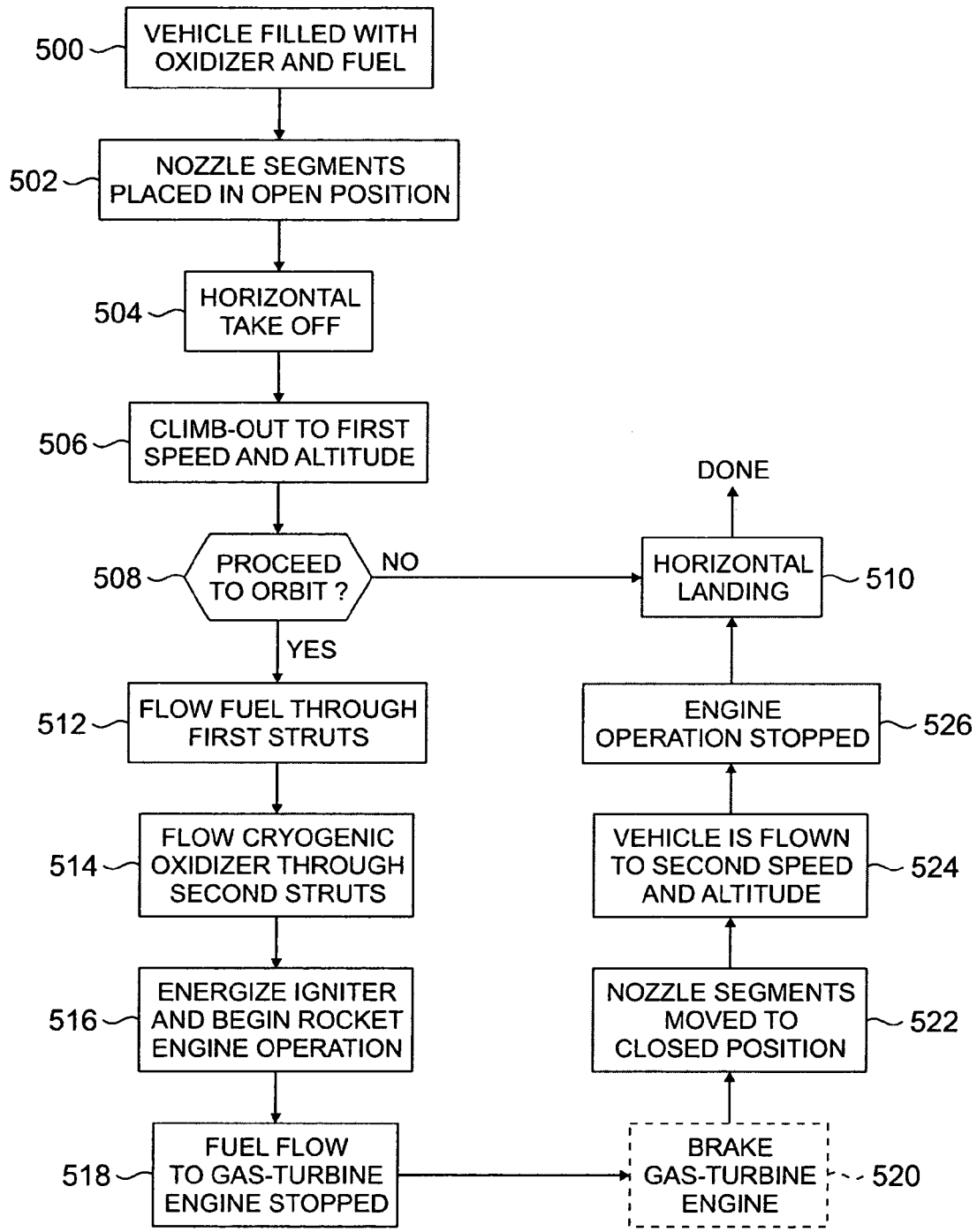
FIG. 18 is a flow chart illustrating the operation of a vehicle utilizing an integrated airbreathing and non-airbreathing engine system.

FIG. 18 is a flow chart illustrating the operation of the vehicle 400. Initially, the vehicle 400 is filled with oxidizer and fuel (step 500) and the nozzle segment subassembly 202 is driven to the open position (step 502). A conventional horizontal takeoff is then executed from a runway (step 504), with the gas-turbine engine assembly providing thrust. The vehicle 400 then performs a climb-out procedure to reach a first speed and altitude (step 506). Suitable speeds and altitudes for the climb-out are approximately Mach 0.9 and approximately 12.192 km (40,000 feet) above sea level, which are speeds and altitudes typical for commercial jet aviation. Faster speeds and higher altitudes are also acceptable. Upon completion of the climb-out, a decision can be made whether or not to proceed to orbit (decision step 508). If orbit is not desired, the vehicle 400 can execute a conventional horizontal landing at a landing strip (step 510). Such a landing without travel to orbit means that the engine system 100 works only in an airbreathing mode, and can be undertaken by only utilizing the gas-turbine engine assembly.

If it is desired to proceed to orbit (step 508), a transition is initiated to begin operation of the rocket engine assembly. The rocket fuel is pumped through the first strut assembly 136 (step 512). Shortly thereafter, cryogenic oxidizer is pumped through the second strut assembly 138 (step 514). The fuel from the first strut assembly is first pumped through the walls of the rocket combustion chamber 134 to provide cooling. The oxidizer is pumped directly from the second strut assembly 138 to the injector assembly 132. The injector assembly 132 includes an igniter, which is energized to achieve rocket engine ignition (step 516). Ignition of the rocket engine assembly occurs while maintaining gas-turbine engine assembly operation. While both the gas-turbine engine assembly and the rocket engine assembly are operating, a dual flow thrust stream is formed. A high velocity, low pressure rocket flow stream is created at the center of a lower velocity, higher pressure gas-turbine engine flow stream. The lower velocity, higher pressure, gas-turbine flow stream acts as a "pneumatic nozzle" to direct the high velocity, low pressure rocket flow stream during this intermediate engine transition phase.

After stable dual flow stream operation of the engine system 100 is achieved, fuel supply to the gas-turbine engine is stopped (step 518). Optionally, the rotors of the gas-turbine engine assembly can be braked to more quickly arrest their rotation (optional step 520). Thrust transfer from the gas-turbine engine assembly to the rocket engine assembly then begins.

Once the rotational speed of the rotor assemblies of the gas-turbine engine assembly have sufficiently slowed (slowing that rotation reduces aerodynamic losses during transition), the convertible nozzle and ejector duct assembly 102 is moved to the closed position to engage the rocket combustion chamber 134 and form a diverging nozzle portion (step 522). Aerodynamic loads across the closing nozzle segment subassembly 202 are balanced between the inner, central (high velocity, low pressure) rocket flow stream and the outer (lower velocity, higher pressure) gas-turbine flow stream, which helps prevent excessive nozzle segment subassembly loading. During this step (step 522), the optional propellant containers 404 can be discharged to provide thrust, in order to assure a relatively constant thrust during the transition between airbreathing and non-airbreathing operation. The nozzle segment subassembly 202 then completely closes as the rotor assemblies of the gas-turbine engine assembly come to a complete stop. A full rocket thrust chamber profile is achieved when the nozzle segment subassembly 202 is fully closed. The engine system 100 is now configured for non-airbreathing operation.

Next, the vehicle's angle of attack is increased and the vehicle 400 is flown to a second speed and altitude, powered by the rocket engine assembly (step 524). Suitable speeds and altitude are those sufficient to reach escape velocity (about 40,233 km/h or 25,000 mph) and travel to an orbital altitude with a microgravity environment (e.g., about 120-500 km above sea level or 75-300 miles above sea. level). At this point the vehicle 400 has reached space and is placed in a desired. orbit. Engine operation can then be terminated (step 526).

The vehicle can later travel back toward the Earth's surface, by powering the rocket engine assembly to leave orbit, and can execute a conventional horizontal landing (step 510). The entire trip, from takeoff to landing, can be accomplished without jettisoning any booster rockets or other engine or fuel system components. This provides single-stage-to-orbit capabilities for the vehicle 400. This is made possible by the engine system 100, which integrally provides both airbreathing and non-airbreathing operation.

It should be recognized that the present invention provides numerous benefits. The following are selected examples. First, by enabling both horizontal takeoff and landings, vertical liftoff is not required. This can greatly reduce stress on vehicle and engine components, and offers the potential for greatly increased safety and reliability. Secondly, the present invention provides for a single-stage-to-orbit engine system and vehicle. This provides for more readily reusable components and systems, which reduces the need for disposal or retrieval of jettisoned parts, as well as reduces the need for reworking and remanufacturing of components. Third, the present invention enables the use of the same or similar fuels for both airbreathing and non-airbreathing operation, which can help reduce the mass of fuel required to be carried on board for orbital flight. Fourth, the present invention provides fuel and oxidizer flow paths through a gas-turbine exhaust path. The first and second strut assemblies enable fuel and oxidizer to be delivered to a rocket engine assembly located along an engine centerline (and generally aft of a gas-turbine engine assembly).

Although the present invention has been described with reference to preferred embodiments, workers skilled in the art will recognize that changes may be made in form and detail without departing from the spirit and scope of the invention. For instance, various types of conventional rocket engines can, in essence, be combined with various types of conventional gas turbine engines according to the present invention to provide an integrated airbreathing and non-airbreathing engine system. Moreover, the particular shapes and arrangements of the engine systems components can vary. For example, the convertible nozzle and ejector duct segments can have shapes that are precisely determined based on an aerodynamic analysis that accounts for the other characteristics of the engine system.

What is claimed is:

1. An engine assembly comprising:
   a gas-turbine engine having a tailcone portion and a bypass duct;
   a rocket engine combustion assembly located at the tailcone portion of the gas-turbine engine;
   a movable nozzle segment subassembly that is selectively engageable with the gas-turbine engine bypass duct in an open position and with the rocket engine combustion assembly in a closed position, wherein the movable nozzle segment subassembly comprises a plurality of movable nozzle segments; and
   an aft strut subassembly that includes a plurality of struts each connected to the rocket engine combustion assembly, wherein a drive actuator assembly is positioned adjacent to each of the struts and each drive actuator assembly is operatively engaged with one of the nozzle segments, each drive actuator assembly including a motor and a flexible drive shaft, the flexible drive shaft extending along the corresponding strut in a generally radial direction and configured to operatively engage a corresponding one of the plurality of movable nozzle segments.

2. The assembly of claim 1, and further comprising:
an ejector duct segment subassembly fixed relative to an airframe anchor location of the engine, wherein the ejector duct subassembly mates with the movable nozzle segment subassembly in the open position.

3. assembly of claim 1, wherein each of the nozzle segments is pivotally mounted at an aft end.

4. The assembly of claim 1, wherein each of the plurality of nozzle segments includes one or more integral structural members for providing structural support.

5. The assembly of claim 1, wherein at least one of the plurality of struts has an internal passageway for carrying fluid.

6. The assembly of claim 1, wherein each of the struts has an airfoil-contoured shape.

7. The assembly of claim 5, and further comprising a fluid supply manifold in fluid communication with at least one of the struts.

8. The assembly of claim 7, wherein the fluid supply manifold has a generally circular shape.

9. The assembly of claim 7, wherein the fluid supply manifold has a plurality of inlets.

10. The assembly of claim 1, and further comprising a forward strut subassembly that includes a forward strut with an internal passageway for carrying a fluid material.

11. The assembly of claim 10, wherein the internal passageway of the forward strut is in fluid communication with an injector assembly that is operably connected to a forward portion of the rocket engine combustion assembly.

12. The assembly of claim 10, wherein the forward strut is located aft of a turbine exhaust case of the gas-turbine engine.

13. The assembly of claim 10, and further comprising a fluid manifold in fluid communication with the internal passageway of the forward strut.

14. The assembly of claim 13, wherein the fluid manifold has a generally circular shape.

15. The assembly of claim 10, and further comprising one or more additional forward struts.

16. The assembly of claim 1, wherein the nozzle segment subassembly in the closed position forms a nozzle segment having a contour suitable for non-airbreathing operation.

17. The assembly of claim 1, wherein the rocket engine combustion assembly comprises:
an injector assembly; and
a combustion chamber operably connected to the injector assembly.

* * * * *